(12) United States Patent
Egusa et al.

(10) Patent No.: US 7,389,081 B2
(45) Date of Patent: *Jun. 17, 2008

(54) PROCESS FOR MANUFACTURING AN IMAGE RECORDING BODY AND APPARATUS FOR MANUFACTURING THE SAME

(75) Inventors: Naoyuki Egusa, Ashigarakami-gun (JP); Tetsuro Kodera, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 403 days.

This patent is subject to a terminal disclaimer.

(21) Appl. No.: 11/150,277

(22) Filed: Jun. 13, 2005

(65) Prior Publication Data

US 2006/0210907 A1 Sep. 21, 2006

(30) Foreign Application Priority Data

Mar. 18, 2005 (JP) ............................. 2005-080562

(51) Int. Cl.
*G03G 15/20* (2006.01)
(52) U.S. Cl. ............... 399/342; 399/307; 430/124.1
(58) Field of Classification Search ........... 430/124.52, 430/124.1; 399/342, 307
See application file for complete search history.

(56) References Cited

U.S. PATENT DOCUMENTS

| 4,242,566 | A | 12/1980 | Scribner |
| 5,342,715 | A | 8/1994 | Kamath et al. |
| 5,637,174 | A | 6/1997 | Field et al. |
| 5,927,189 | A | 7/1999 | Jones et al. |
| 5,974,282 | A | 10/1999 | Yamada |
| 6,029,041 | A | 2/2000 | Takano et al. |
| 6,134,399 | A | 10/2000 | Hino et al. |
| 6,296,032 | B1 | 10/2001 | Louie et al. |
| 6,370,352 | B1 | 4/2002 | Tomita |
| 6,663,238 | B2 * | 12/2003 | Kikuchi et al. ............ 347/102 |
| 6,907,221 | B2 | 6/2005 | Tanino et al. |
| 7,221,897 | B2 | 5/2007 | Egusa et al. |
| 2004/0136750 | A1 | 7/2004 | Yoshioka et al. |
| 2005/0175381 | A1 * | 8/2005 | Egusa et al. ............... 399/342 |

FOREIGN PATENT DOCUMENTS

| JP | A-62-041134 A | 2/1987 |
| JP | A-02-25331 | 1/1990 |
| JP | A-08-194393 A | 7/1996 |

(Continued)

*Primary Examiner*—John L Goodrow
(74) *Attorney, Agent, or Firm*—Oliff & Berridge, PLC (57) ABSTRACT

The present invention provides a method for manufacturing an image recording body comprising: image-forming, to form an image on a surface of a film by an electrophotographic method; positioning, by overlaying the film onto a support so that at least one side of the support and a side of the film on which the image is formed are opposed to each other so as to obtain a laminate body; and heating and pressing the laminate body, wherein cleaning at least one of a surface of the laminate, a surface of the film and a surface of the support is conducted during at least one of a timing between the positioning and the heating and pressing and a timing between the image-forming and the positioning. The present invention further provides an apparatus for manufacturing an image recording body in accordance with the method.

15 Claims, 3 Drawing Sheets

FOREIGN PATENT DOCUMENTS

| | | |
|---|---|---|
| JP | A-09-138601 | 5/1997 |
| JP | A-11-161040 A | 6/1999 |
| JP | A-11-334265 | 12/1999 |
| JP | A-2001-092255 | 4/2001 |
| JP | A 2004-188603 | 7/2004 |
| JP | A 2004-195973 | 7/2004 |

\* cited by examiner

PROCESS FOR MANUFACTURING AN IMAGE RECORDING BODY AND APPARATUS FOR MANUFACTURING THE SAME

CROSS-REFERENCE TO RELATED APPLICATION

This application claims priority under 35 USC 119 from Japanese Patent Application No. 2005-80562, the disclosure of which is incorporated by reference herein.

BACKGROUND OF THE INVENTION

1. Field of Invention

The present invention relates to a process for manufacturing an image recording body such as a plastic sheet using an image formed by an electrophotographic method image forming apparatus, and an apparatus for manufacturing the same. More particularly, the invention relates to a process for manufacturing image recording bodies used in an information medium of non-contact or contact type, containing personal information and/or image information-recorded. Examples of such an information medium are a photograph-containing cash card, a staff identity card, a student identity card, a membership identity card, a residents identity card, various licenses, and various qualification certificates. Further examples of image recording bodies the invention relates to are identity verification image sheets and image display boards used, for example, in medical areas, and display labels. The information also relates to an apparatus for manufacturing the same.

2. Description of the Related Art

In recent years, accompanied with developments in image formation techniques, means to form images of the uniform quality in large quantities and at low cost by various printing methods are know. Examples are intaglio printing, letterpress printing, lithography printing, gravure printing and screen printing. Such printing methods are also used in many cases for surface printing of an information medium which holds prescribed information, and can communicate with an external apparatus in a contact or non-contact manner, such as an IC-card, a magnetic card, an optical card, and combinations thereof.

However, for example, in screen printing many printing plates corresponding to the number of images to be printed are necessary and, in the case of color printing, further, printing plates becomes necessary with the number of colors. For this reason, these printing methods are unsuitable for application singly to discrete personal information (such as photographs, name, address, date of birth, and various licenses).

In response to the aforementioned problems, an image forming device which is most popular currently is an image forming method with a printer, which adopts sublimation-type or melt-type thermal transfer using an ink ribbon. These can easily print personal discrimination information. However, there is still a problem that, when a printing rate is increased, resolution is decreased and, when the resolution is increased, the printing rate is reduced.

In contrast, image formation (printing) by electrophotographic methods is performed by a method of forming a visible image (toner image) on an image carrying body surface. This is done by: uniformly electrifying an image carrying body surface; irradiating this with light, in response to an image signal, to form an electrostatic latent image due to a potential difference between an exposed part and a non-exposed part; and, thereafter, electrostatically developing a color powder (image forming material) called toner, having a polarity opposite to (or the same as) the electrification. In the case of a color image, color visible images are formed by repeating these processes a number of times, or aligning plural image formers. These color images are transferred onto an image recording body, and this is fixed (fixation is solidification due to melting and cooling of a color powder mainly by heat), thereby, obtaining a color image.

As described above, in an electrophotographic method, since electrostatic latent image on an image carrying body surface are electrically formed by image signals, not only can the same image be formed many times, but also different images can be easily handled, thereby, images can be formed. In addition, since a toner image on an image carrying body surface can be almost completely transferred onto an image recording body surface, and a toner image slightly remaining on an image carrying body surface can be easily removed by a resin blade or brush, it is a printing method which can easily be prepared for small batch production of various article.

The toner is usually formed by melting and mixing a heat-meltable resin and a pigment and, optionally, an additive such as an electrification controlling agent. This kneaded product is then ground and finely-divided. Further, the electrostatic latent images in the aforementioned electrophotographic method have considerably higher resolution than that of the finely-divided toner, and sufficient resolution can be expected compared to the resolution of the screen printing or thermal transfer using an ink ribbon.

Regarding a color image, by using four primary colors of cyan, magenta, yellow and black as color toners, and mixing them, theoretically the same colors as that of printing can be reproduced. In addition, in a color toner, since a toner resin and a pigment can be blended relatively freely, it is easy to increase image masking properties with toner.

For using the aforementioned electrophotographic apparatus to manufacture various cards, there have already been several proposals (for example, see Japanese Patent Application Laid-Open (JP-A) Nos.2004-188603 and 2004-195973).

In the apparatuses disclosed in them, a plastic sheet of high resolution can be produced at high productivity. However, the following problems are present.

That is, a light-transmissible film on which an image has been formed by an electrophotographic method is charged up, and the film tends to adsorb dust in the air unless the charge is removed. Therefore, although a plastic sheet is manufactured inside a portion of a plastic sheet manufacturing apparatus, there is a very high possibility that dirt or dust is adhered to the light-transmissible film during positioning, heat-pressing, or conveying. This dirt or dust made apparent as defects of the plastic sheet, and the quality of manufactured plastic sheet is thus deteriorated.

SUMMARY OF THE INVENTION

The invention is provided in consideration of the aforementioned problems of conventional technology. That is, the invention relates to the process for manufacturing an image recording body using an electrophotographic apparatus as a means to form an image on a plastic film, and an apparatus for manufacturing the same. The invention provides a process for manufacturing an image recording body which can manufacture an image recording body with no foreign matter mixed therein and at high productivity, and an apparatus for manufacturing the same.

Namely, a first aspect of the invention is a method for manufacturing an image recording body comprising: image-forming, to form an image on a surface of a film by an electrophotographic method; positioning, by overlaying the film onto a support so that at least one side of the support and a side of the film on which the image is formed are opposed to each other so as to obtain a laminate body; and heating and pressing the laminate body, wherein cleaning at least one of a surface of the laminate, a surface of the film and a surface of the support is conducted during at least one of a timing between the positioning and the heating and pressing and a timing between the image-forming and the positioning.

In the first aspect of the invention, since before heating and pressing it becomes possible to remove the dirt or dust on a surface of one or more of the laminate, the film and/or the support, a process for manufacturing an image recording body having a high good product ratio can be obtained.

One embodiment of the first aspect of invention is characterized in that: the film is a laminate film for electrophotography; the positioning comprises forming the laminate body by overlaying two laminate films for electrophotography so that sides on which images of each of the laminate films are formed oppose each other via the support; and the heating and pressing causes laminating of the support to the two laminate films.

In the above embodiment, in the case of an image recording body obtained by laminating a support using a lamination film for electrophotography as a film, since the influence of dirt on the laminate surface or between film/support can be eliminated, the effect is particularly exerted.

Another embodiment of the first aspect of invention is characterized in that: the film is an electrophotographic image forming material transferring sheet; a mirror image, that is formed by image forming material, is formed in the image-forming; and further comprising, after the heating and pressing, then cooling the image forming material then peeling the electrophotographic image forming material transferring sheet from the support so as to transfer the image forming material onto the support so as to record the image.

In the above embodiment, in the case of an image recording body obtained by transferring an image onto a support using as a film an electrophotographic image forming material transfer sheet, since the influence of dirt on a pressing surface or between film/support can be eliminated, the effect is particularly exerted.

A second aspect of the invention is an apparatus for manufacturing an image recording body comprising: an image-forming device, which forms an image on a surface of a film by an electrophotographic method; a positioning device, which overlays the film onto a support so that at least one side of the support and a side of the film on which the image is formed are opposed to each other so as to obtain a laminate body; and a heating-and-pressing device, which heats and presses the laminate body, wherein a cleaning device, which cleans at least one of a surface of the laminate, a surface of the film and a surface of the support, is provided in a direction of conveyance of the film in at least one of a position between the positioning device and the heating-and-pressing device and a position between the image-forming device and the positioning device.

In the second aspect of the invention, since before heat pressing a cleaning apparatus for removing dirt or dust on a surface of one or more of the laminate, the film and/or the support is provided, an apparatus for manufacturing an image recording body having a high good product ratio can be provided.

One embodiment of the second aspect of invention is characterized in that: the film is a laminate film for electrophotography; the positioning device forms the laminate body by overlaying two laminate films for electrophotography so that sides on which images of each of the laminate films are formed oppose each other via the support; and the heating-and-pressing device causes laminating of the support to the two laminate films.

In the above embodiment, when manufacturing an image recording body obtained by laminating a support using as a film a lamination film for electrophotography, since the influence of dirt on a laminate surface or between film/support can be eliminated, the effect is particularly exerted.

Another embodiment of the second aspect of invention is characterized in that: the film is an electrophotographic image forming material-transferring sheet; a mirror image, that is formed by image forming material, is formed by the image-forming device; and further comprising a peeling device, which, after heating and pressing then cooling the electrophotographic image forming material transferring sheet, peels the electrophotographic image forming material transferring sheet from the support so as to transfer the image forming material onto the support so as to record the image, and which is provided after the heating-and-pressing device in a direction of conveyance of the film.

In the above embodiment, when an image recording body obtained by transferring an image onto a support using an electrophotography image forming material transferring sheet as a film is manufactured, since influence of a dirt on a pressing surface or between film/support can be eliminated, the effect is particularly exerted.

Still another embodiment of the second aspect of invention is characterized in that the cleaning device comprises at least one pair of cleaning rolls.

In the above embodiment, by passing the laminate between a pair of cleaning rolls as a cleaning device, it becomes possible to assuredly remove dirt or dust on a surface of the laminate.

Still another embodiment of the second aspect of invention is characterized in that the cleaning device comprises a charge-removing member, for removing charge on a surface of the laminate body, and a pair of cleaning rolls.

In the above embodiment, since the laminate is passed between a pair of cleaning rolls after the charge of the laminate is removed by a charge-removing member, an apparatus for manufacturing an image recording body having an even higher good product ratio than that of the above apparatus for manufacturing an image recording body is obtained.

BRIEF DESCRIPTION OF THE DRAWINGS

Preferable embodiments of the invention will be described in detail based on the following figures.

DETAILED DESCRIPTION OF THE INVENTION

The present invention will be explained in detail below.

Hereinafter, entities having substantially the same function will be explained by using the same symbol throughout all the drawings and, occasionally, the explanation will be omitted in some cases. In addition, hereinafter, the process for manufacturing an image recording body of the invention, and the apparatus for manufacturing an image recording body of the invention will be explained together.

The process for manufacturing an image recording body of the invention is characterized by having: image-forming, to form an image on a surface of a film by an electrophotographic method; positioning, by overlaying the film onto a support so that at least one side of the support and a side of the film on which the image is formed are opposed to each other so as to obtain a laminate body; and heating and pressing the laminate body, wherein cleaning at least one of a surface of the laminate, a surface of the film and a surface of the support is conducted during at least one of a timing between the positioning and the heating and pressing and a timing between the image-forming and the positioning.

In the invention, as described later, an image recording body is manufactured by forming a so-called toner image on a surface of a plastic film (film) and heating and pressing this plastic film and a support so that the support is laminated onto the plastic film or the toner image is transferred onto the support.

At this time, after manufacturing as described above, in some cases dirt or dust gets mixed into an image recording body. When the image recording body is used by such as utilization by direct possession by a person as in a card, these foreign matters are particularly given an attention as an image quality defect, and quality as an information recording medium is greatly deteriorated.

In order to reduce occurrences of image quality defects in the image recording body, the present inventors studied how effectively to remove dirt or dust adhered to the film. As a result, the present invention inventors found out that, in particular in an apparatus as in the invention for performing image formation to heat pressing in a continuous manner, it is effective to remove dirt or dust between image formation and heat pressing, and in particular immediately before heat pressing. Thus the invention was completed.

That is, the level at which when a person holds a card (image recording body) in their hand and feels no image quality defect is a level at which little foreign matter is present, in particular, near the face surface of the image recording body. It was seen that, in order to attain such a level, it is more effective to clean a film after image formation or a laminate immediately before heat pressing rather than clean a film surface before image formation.

Before describing the process for manufacturing an image recording body of the invention which can obtain the above effect, an image recording body manufactured by the invention will be briefly explained.

Figure 6:
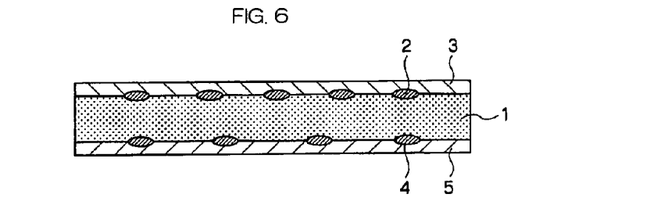
FIG. 6 is a cross-sectional view illustrating a configuration of an image recording body manufactured by the apparatus for manufacturing the image recording body of the invention.

FIG. 6 shows a cross-section of the composition of one example of an image recording body manufactured by the process for manufacturing an image recording body of the invention. This image recording body is characterized in that a laminate film for electrophotography (hereinafter, referred to as "laminate film" in some cases), on which a toner image is formed, is overlaid on a core sheet (support) on at least one of the front and/or back surfaces thereof.

As shown in FIG. 6, an image recording body is constructed such that a core sheet 1, and a surface film 3 and a back film 5 (both are laminate films for electrophotography), on which images 2, 4 are formed respectively, are overlaid and laminated so that the surfaces oon the sides with images 2, 4 formed thereon face the core sheet 1.

The construction of an image recording body is not limited to the example shown in FIG. 6. For example, any one of a surface film 3 and a back film 5 may be a non-light-transmissible film and, any one image among the formed images 2, 4, may be omitted. Alternatively, an image is formed on one side of a surface film 3 and/or a back film 5 (e.g. non light-permeable films), and lamination is performed by opposing the non-image surface. In this case, an image forming surface of the film(s) may be further laminated with a protecting film. Therefore, an image formed on a surface of a laminate film for electrophotography may be an original image or a mirror image.

FIG. 7 relates to another image recording body manufactured by the process for manufacturing a plastic sheet of the invention, and is a cross-section showing one example of the state before heating pressing in manufacturing of an image recording body, and an image recording body after heating pressing and peeling. In FIGS. 7, 100 and 200 represent an image forming material transferring sheet for electrophotography and 300 represents a material to be transferred onto (support).

Figure 7A:
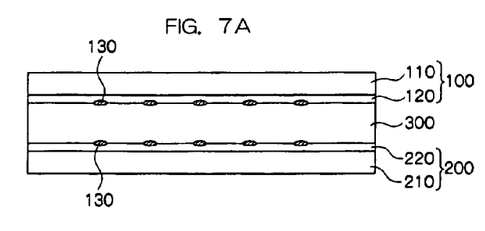
FIG. 7 is a cross-sectional view illustrating a configuration of another image recording body manufactured by the apparatus for manufacturing the image recording body of the invention.

FIG. 7A shows the state where image forming material transferring sheets for electrophotography (hereinafter, referred to as "transferring sheet") 100 and 200 and a material to be transferred onto 300 are overlaid to construct a laminate. Before heating and pressing, an image forming material 130 (the toner is formed in the invention on the transferring sheets in a mirror image) is present on the side of image receiving layers 120, 220 of the transferring sheets, or at the interfaces between image receiving layers 120, 220 and a material to be transferred onto 300.

Figure 7B:
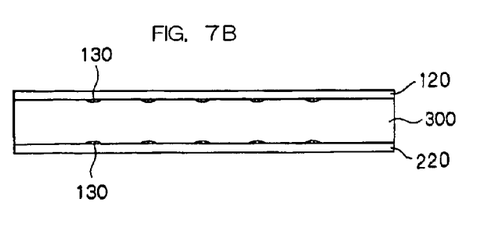

On the other hand, as shown in FIG. 7B, after heating pressing and peeling, image forming material 130 is in the state where it is almost completely embedded in surfaces of the material to be transferred onto 300 and, protecting layers 120, 220 are present on an upper layer of an image forming material 130. Therefore, the manufactured image recording body has the same feel as that of an image recording body which has simply been printed, and an image forming material 130 is not easily peeled off. Since there are protecting layers 120, 220, image defects due to abrasion do not occur.

Next, a process for manufacturing an image recording body of the invention which can provide the image recording body, and an apparatus for manufacturing the same will be explained using the drawings.

First Embodiment of the Invention

Figure 1:
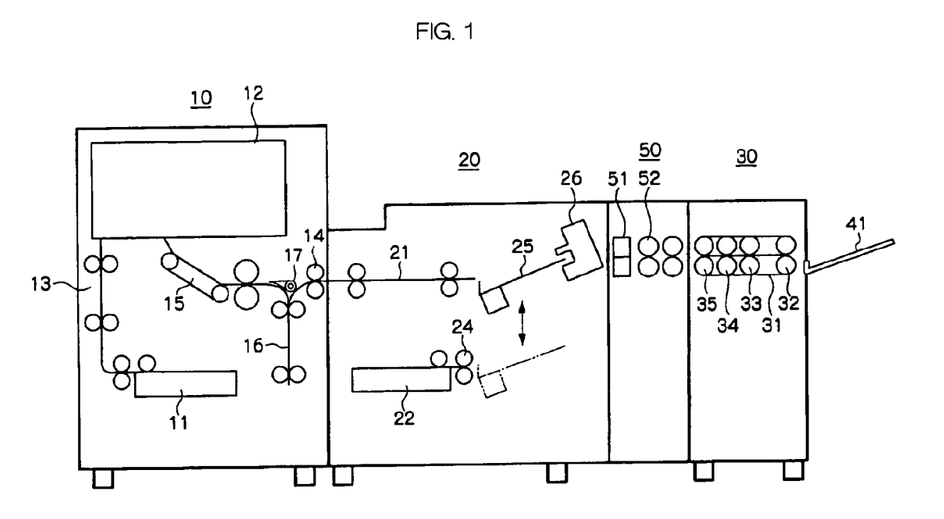
FIG. 1 is a schematic drawing illustrating a first embodiment of the apparatus for manufacturing the image recording body of the invention.

FIG. 1 is a schematic construction view of the apparatus for manufacturing an image recording body of the invention which can implement the process the manufacturing an image recording body of the invention. This manufacturing apparatus is for manufacturing an image recording body shown in FIG. 6, and a light-transmissible film (laminate film for electrophotography) is used as the film.

The apparatus for manufacturing an image recording body shown in FIG. 1 is constructed of an image forming apparatus (image forming device) 10, a collating apparatus 20, a cleaning apparatus (cleaning device) 50, and a heating pressing apparatus (heating and pressing device) 30.

An image forming apparatus 10 is constructed, for example, of a film stacker 11 (film storage unit), an image forming part 12, a conveying path 13 for conveying a light-transmissible film from film stacker 11 to image forming part 12, and a conveying path 15 for conveying a light-transmissible film after image formation from an image forming part 12 to a discharge port 14. Other constructions are omitted.

An image forming part 12, not shown, is constructed of a known electrophotographic method color image forming apparatus. It includes: a latent image carrying body, for forming a latent image; developing equipment for developing the latent image using a developer containing at least a toner to obtain a toner image, a transferring equipment for transferring a developed toner image onto a light-transmissible film, and a fixing equipment for fixing the toner image transferred onto a light-transmissible film by heating and pressing. By this construction, an image forming step in a process for manufacturing an image recording body of the invention can be performed.

Conveying paths 13 and 15 are constructed of plural roller pairs including a driving roller pair, and guides (not shown) and, in conveying path 15, an inverting path 16 for inverting a conveying direction of a light-transmissible film by 180° is further provided. A cam 17 for changing a guiding direction of a light-transmissible film is provided near a branch of conveying path 15 and inverting path 16. When a light-transmissible film is reciprocated by this inverting path 16, and is returned to conveying path 15, the conveying path of the light-transmissible film is inverted by 180° and, at the same time, a light-transmissible film is conveyed with the back and front surfaces inverted.

A collating apparatus 20 is constructed of a core sheet stacker 22 (a support stacker), a collating tray (positioning device) 25, a conveying path 24 for supplying a core sheet form a core sheet stacker 22 to collating tray 25, and a conveying path 21 for supplying a light-transmissible film discharged from a discharge port 14 of image forming apparatus 10 to collating tray 25.

A discharge part of conveying path 24 for supplying a core sheet to collating tray 25, and a discharge part of conveying path 21 for supplying a light-transmissible film to collating tray 25 are provided parallel in a height direction.

The conveying path 21 may have a construction, for example, in which a smooth plate-light member, and conveying rolls for conveying a light-transmissible film on a surface thereof are provided, or may be constructed of a rotating belt-like conveying body. And, a conveying roll and a belt are rotated at such as timing that a light-transmissible film is discharged from image forming apparatus 10, and a light-transmissible film is conveyed to collating tray 25.

Core sheet stacker 22 is provided with a pick up roll or a paper supplying roll such as those provided in a conventional paper supplying apparatus, and a paper supplying roll is rotated immediately after collating tray 25 is moved to a position of a discharge port of a core sheet stacker 22, to convey a core sheet to collating tray 25.

Collating tray 25 is constructed so that a core sheet and a light-transmissible sheet can be supplied thereto through the discharge part of conveying path 24 and discharge part of conveying path 21. It would be a construction in which, for example, end part(s) of the collating tray 25 are connected to the outer wall of a belt which is stretched up and down (upper and lower directions in the figure). The tray then is raised and lowed along with driving rotation of the belt. There is no restriction to this mechanism raising and lowing means, and a known raising and lowing means, such as a motor drive can be used. In addition, a means (not shown) for positioning by lining up the ends of core sheets 1 and surface films 3 laminated in FIG. 5, and back films 5 is provided (positioning).

In collating tray 25, a tentative fastening apparatus 26 for tentatively fastening a laminate in which two light-transmissible films are laminated via a core sheet is provided. This tentative fastening apparatus 26 is constructed, for example, of a pair of protruding pieces consisting of a metal so that it is heated by a heater and, by holding an end of a laminate by a pair of heated protruding pieces, an end of a laminate is thermally fused to attain tentative fastening.

The tentative fastening apparatus 26, when it is provided on a path for conveying a laminate from collating tray 25 to cleaning apparatus 50 as in FIG. 1, needs to have a structure that it is arranged at an end of collating tray 25 only when tentative fastening and, at other times, it can be removed from the conveying path.

In the present embodiment, a cleaning apparatus 50 is arranged between a collating apparatus 20 and a heating pressing apparatus 30 (between a positioning step and a heating pressing step). In this cleaning apparatus 50, one or more cleaning roll pairs 52 are arranged and, by passing through the nips of the cleaning roll pairs 52, surface dirt or dust on the laminate is removed (cleaning step). It goes without saying that by provision of plural cleaning roll pairs 52 dust or dirt removing performance can be improved and, by providing a cleaner (not shown) for cleaning cleaning roll pair 52, performance of cleaning roll pair 52 can be better maintained.

As a cleaning roll 52, an adhesive roll can be used. More specifically, a roll in which an adhesive elastic body, such as butyl rubber, silicone rubber or urethane rubber, is provided at a periphery of a metal core can be used. However, it is not preferable to use a material in which low-molecular compounds therein bleed out by long term use, or part of the material itself is adhered to a laminate surface.

In the present embodiment, a cleaning roll pair 52 composed of an adhesive roll is used. However, in the invention a means for removing foreign matter such as dirt is not particularly limited, and as long as it is a means capable of removing dirt, such as a brush or air blower, any may be used without any limitation.

On an upstream side of the cleaning roll pair(s) 52, a charge removing member 51, for removing charge of a laminate is provided. This charge removing member 51 may be a charge-removing brush, or may be a fan or blower for blowing ions. By arranging a charge-removing member 51 like this, an adhering force of dirt or dust due to static electricity of a light-transmissible film is reduced, and dirt or dust removing performance in cleaning apparatus 50 can be improved.

In the invention, a cleaning apparatus may be provided between the image forming apparatus and collating apparatus, or between the collating apparatus and heating pressing apparatus. It is most preferable, for reducing dirt or dust in an image recording body after heating pressing, to arrange the cleaning apparatus between collating apparatus 20 and heating pressing apparatus 30. That is to clean the front and back surfaces of a laminate immediately before inserting into heating pressing apparatus 30, as in the present embodiment. Preferable effect of this is remarkable in the case of a belt nip format heating pressing apparatus 30, which is constructed of one belt pair 31 as described later being used.

A heating pressing apparatus 30 has such a construction that, by adopting a belt nip format construction of one belt pair 31, a plastic sheet is easily manufactured in line. Belt pair 31 is constructed so that belt pair 31 does not produce distortion in the state where it is tightened by one tension roll pair 32 and one inlet roll pair 35, respectively.

Further, in an interior of a belt pair 31, one heating pressing roll pair 34 and one cooling roll pair 33 are arranged from both sides (from upper and lower directions in the figure) between tension roll pair 32 and inlet roll pair 35 via a belt, so as to press through belts 31. Tension roll pair 32 and inlet roll pair 35 are arranged without nipping, respectively, so that a gap is provided between belt pairs 31. Thereby, even when belt pair 31 is made wavy due to continuous operation, it is possible to return belts to a predetermined position while it is operated.

In a heating pressing apparatus 30, a laminate is heated and pressed by a heating pressing roll pair 34 arranged downstream of an inlet roll pair 35. Via this heating and pressing, the laminate is thermally fused (laminated).

The thermally fused laminate, so that deformation does not occur, is nipped when passing between heating pressing roll pair 34 and cooling roll pair 33, is passed through cooling roll pair 33 while maintaining planarity, and is discharged in a discharge tray 41.

A plastic sheet (image recording body) after lamination, when it is, for example, a pattern of several cards, is cut into single cards, and cards having front and back surfaces laminated with a light-transmissible film is obtained.

In an image recording body manufactured in accordance with the invention, since cleaning is performed before lamination as described above, for example, when 100 A4 size plastic sheets having the aforementioned pattern of several cards are continuously manufactured, no dirt is observed at all by naked eye in the area of each card (85.6 mm×54 mm).

Second Embodiment of the Invention

Figure 2:
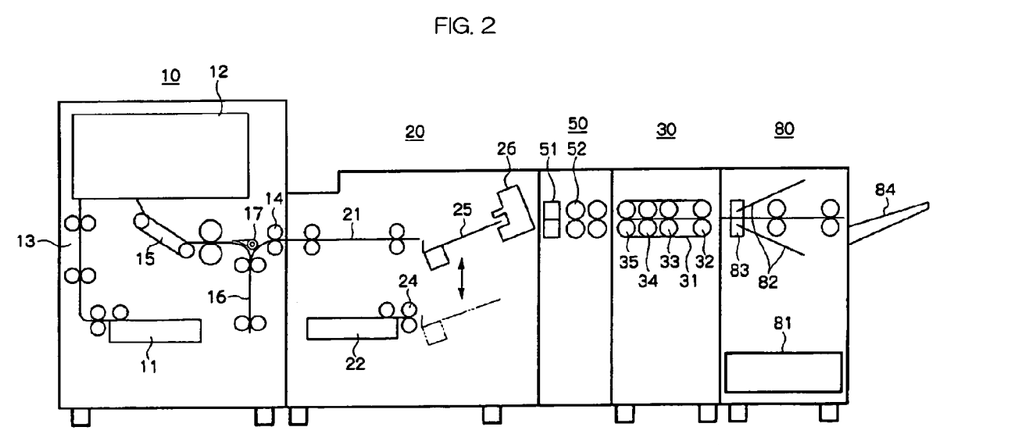
FIG. 2 is a schematic drawing illustrating a second embodiment of the apparatus for manufacturing the image recording body of the invention.

FIG. 2 is a schematic construction view of another example of an apparatus for manufacturing an image recording body of the invention. This manufacturing apparatus is for manufacturing an image recording body shown in FIG. 7, and uses an electrophotographic image forming material transforming sheet as the film.

This manufacturing apparatus has a configuration in which a peeling apparatus (peeling means) 80 is provided further downstream of a heating pressing apparatus 30 of the manufacturing apparatus explained in the first embodiment. Details of the construction, other than the peeling apparatus 80, is the same as that of the manufacturing apparatus shown in FIG. 1 in the first embodiment. To be exact, in the image forming apparatus 10, since an image is transferred from a transferring sheet onto a material to be transferred onto, it is necessary to form an image with a mirror image.

According to the manufacturing apparatus of the present embodiment, the electrophotographic image forming material transferring sheet is separated from the laminate after heating pressing, and an image forming material can be transferred onto a support (peeling).

Since the steps up to and including heating pressing in the present embodiment are the same as those of the first embodiment, those steps are omitted from the description.

A heated and pressed laminate is then conveyed to peeling apparatus 80. The laminate conveyed to peeling apparatus 80 has a construction shown in FIG. 7A. For example, there is a notch at a right end of the leading edge thereof and, at that part, a first transferring sheet 110 and a second transferring sheet are opposite at a certain gap, without adhering to a material to be transferred onto 300. When the leading edge of the laminate approaches an air spraying nozzle 83, compressed air is ejected through the nozzle. Then, ends of first transferring sheet 110 and second transferring sheet 210 are floated away from the material to be transferred onto 300, and tips of guides 82 enter between transferring sheet 110 and the material to be transferred onto 300, and between second transferring sheet 210 and the material to be transferred onto 300. Further, as the laminate is conveyed, two transferring sheets 110 and 210 are conveyed along guides 82 in such a direction that they are separated from the material to be transferred onto 300, and they are peeled from the material to be transferred onto 300.

Then, the material to be transferred onto 300 is discharged into a discharge tray 84, and the material to be transferred onto (image recording body) with a finished recording thereon is obtained. Here, when plural individual images are formed on the material to be transferred onto with finished recording, the material is cut for each image, to obtain image recording bodies having prescribed sizes.

Thereafter, the first transferring sheet 110 and second transferring sheet 210 are discharged, into a transferring sheet discharge tray 81 via a route not shown. Discharged transferring sheets may be returned to a transferring sheet stacker, and image recording may be performed again onto the transferring sheets.

As described above, in the apparatus for manufacturing an image recording body of the present embodiment, an image recording body is obtained by peeling a transferring sheet from a heated and pressed laminate, and transferring an image forming material onto a material to be transferred and, also in the present embodiment, since it becomes possible to remove a dirt or a dust on a surface of the laminate before a heating pressing step as in the first embodiment, transference unevenness when a dirt is present on a surface of a laminate is not caused, and an apparatus for manufacturing an image recording body having a high good product ratio can be obtained.

Third Embodiment of the Invention

Figure 3:
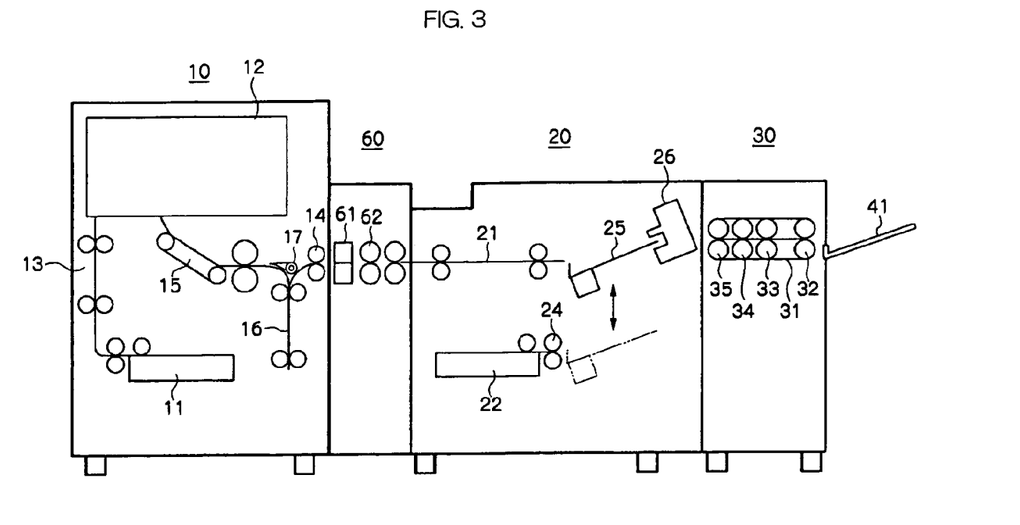
FIG. 3 is a schematic drawing illustrating a third embodiment of the apparatus for manufacturing the image recording body of the invention.

FIG. 3 is a schematic view of the construction of another example of an apparatus for manufacturing the image recording body of the invention. This manufacturing apparatus is for manufacturing an image recording body shown in FIG. 6, and uses a light-transmissible film (laminate film for electrophotography).

The manufacturing apparatus shown in FIG. 3 has the same construction as that of the manufacturing apparatus shown in FIG. 1 explained for the first embodiment except that a cleaning apparatus 60 is provided between an image forming apparatus 10 and a collating apparatus 20 (between image forming and positioning steps). By such a construction, it becomes possible to clean front and back surfaces of a light-transmissible film (laminate film for electrophotography) on which an image discharged from an image forming apparatus 10 is formed. That is, it becomes possible to remove dirt or dust between a core sheet 1 and light-transmissible films 3,5 in the laminate shown in FIG. 6. As a result, dirt or dust of a laminate can be reduced, and an apparatus for manufacturing a plastic sheet (image recording body) having a high good product ratio can be provided.

Since functions of a cleaning roll 62 and a charge-removing member 61 in FIG. 3 are the same as those of cleaning roll 52 and charge-removing member 51 in the first embodiment, explanation will be omitted.

In the manufacturing apparatus shown in FIG. 3, a cleaning apparatus 50 explained in the first embodiment may be further arranged between a collating apparatus 20 and a heating pressing apparatus 30. By such a construction, the rate of occurrence of defective product (product in which dirt or the like, which can be confirmed by visual observation, is present in the card size area) when an image recording body is continuously manufactured, can be further reduced.

On the other hand, it is also possible to arrange a peeling apparatus 80, as explained in the second embodiment, further downstream of heating pressing apparatus 30 of the manufacturing apparatus shown in FIG. 3, and perform image formation as a mirror image using an electrophotography image forming material transferring sheet as a film. In this case since not only transference unevenness in the finished recording of the material to be transferred onto, but also occurrence of defects of toner images can be suppressed, and an image recording body as shown in FIG. 7B can be obtained at a high good product ratio.

Fourth Embodiment of the Invention

Figure 4:
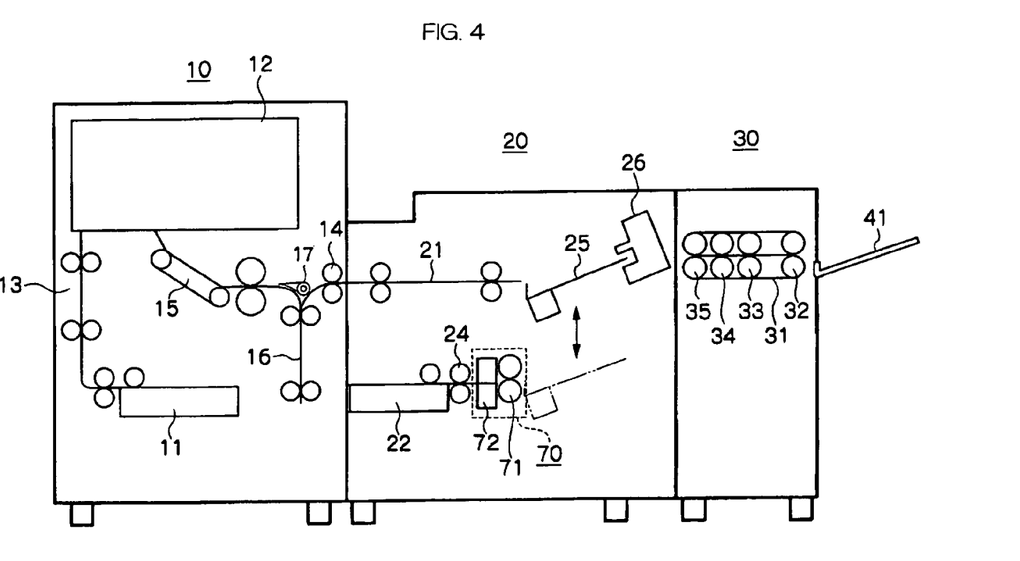
FIG. 4 is a schematic drawing illustrating a fourth embodiment of the apparatus for manufacturing the image recording body of the invention.

FIG. 4 is a schematic view of a construction of another example of an apparatus for preparing an image recording body of the invention. This manufacturing apparatus is for manufacturing an image recording body shown in FIG. 6, and uses a light-transmissible film (laminate film for electrophotography) as the film.

The manufacturing apparatus shown in FIG. 4 has the same construction as that of the manufacturing apparatus shown in FIG. 1 explained in first embodiment except that a cleaning apparatus 70 is arranged on a conveying path 24 (between an image forming step and a positioning step) for supplying a core sheet 10 from a core sheet stacker 22 (a support stacker) to a collating tray 25. By such the construction, it becomes possible to clean front and back surfaces of a core sheet support discharged from a core sheet stacker 22. That is, it becomes possible to remove dirt or dust between a core sheet 1 and light-transmissible films 3 and 5 shown in FIG. 6. As a result, dirt or dust of a laminate can be reduced, and an apparatus for manufacturing a plastic sheet (image recording body) having a high good product ratio can be obtained.

Since functions of a cleaning roll 72 and a charge-removing member 71 in FIG. 4 are the same as those of cleaning roll 52 and charge-removing member 51 in the first embodiment, explanation will be omitted.

In the manufacturing apparatus shown in FIG. 4, a cleaning apparatus 50 explained in the first embodiment may be further provided between a collating apparatus 20 and a heating pressing apparatus 30. By such a construction, the rate of occurrence of defective product (in which dirt, which can be confirmed by visual observation, is present in a card size area) when an image recording body is continuously manufactured can be further reduced.

On the other hand, it is possible to arrange a peeling apparatus 80, as explained in the second embodiment, further downstream of heating pressing apparatus 30 of the manufacturing apparatus shown in FIG. 4, and perform image formation in a mirror image manner using an electrophotography image forming material transferring sheet as a film. In this cace, since not only transference unevenness in the finished recording of the material to be transferred onto, but also occurrence of defects of toner images can be suppressed. So, as in the second embodiment, an image recording body shown in FIG. 7B can be obtained at a high good product ratio.

Fifth Embodiment of the Invention

Figure 5:
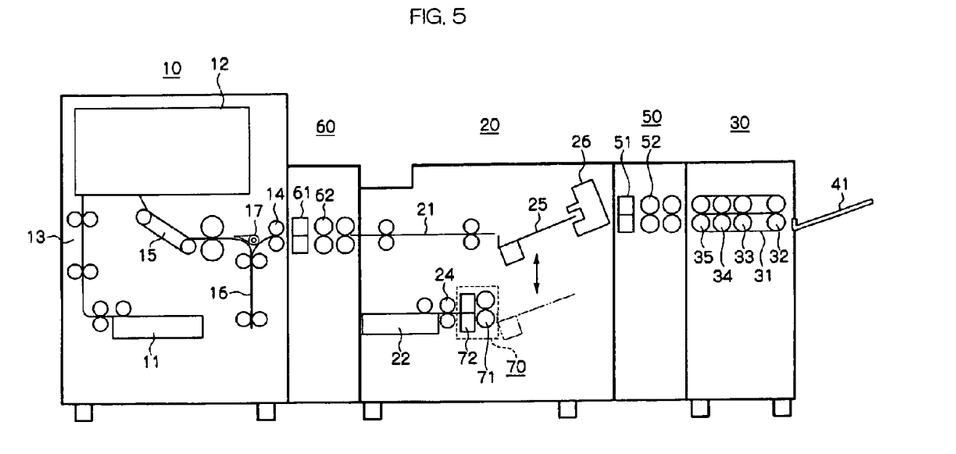
FIG. 5 is a schematic drawing illustrating a fifth embodiment of the apparatus for manufacturing the image recording body of the invention.

FIG. 5 is a schematic construction view of other example of the apparatus for manufacturing an image recording body of the invention. This manufacturing apparatus is for manufacturing an image recording body shown in FIG. 6, and a light-transmissible film (laminate for electrophotography) is used as the film.

The manufacturing apparatus shown in FIG. 5 has a construction in which all cleaning apparatuses 50, 60, 70, explained in the first, third and fourth embodiments respectively, and the details of the other constructions are the same as the respective constructions explained in the first embodiment. By such a construction, cleaning of a light-transmissible film and a core sheet (laminate film for electrophotography and support) before collating can be performed. Further, it becomes possible to clean front and back surfaces of a laminate of a core sheet 1 and light-transmissible films 3, 5 shown in FIG. 6, and an apparatus for preparing a plastic sheet (image recording body) having an extremely high good product ratio can be obtained.

On the other hand, it is possible to arrange a peeling apparatus 80 explained in the second embodiment further downstream of heating pressing apparatus 30 of the manufacturing apparatus shown in FIG. 5, and perform mirror image formation using as a film an electrophotographic image forming material transferring sheet. In this case, since not only transference unevenness in the finished recording of the material to be transferred onto but also occurrence of detects of toner images can be suppressed, as in the second embodiment an image recoding body as shown in FIG. 7B can be obtained at an extremely high good product ratio.

Now the support and film used in the invention will be explained. In the invention, as described above, in the case of the image recording body as shown in FIG. 6, the support is a core sheet 1, and the film is the laminate films for electrophotography 3 and 5. In the case of an image recording body as shown in FIG. 7, the support is the material to be transferred onto 300, and the film is the transferring sheets 100, 200.

Support

Core Sheet

A support, namely, a core sheet used in the invention, is preferably opaque so that an image formed on a light-transmissible film can be visible when it is formed into a plastic sheet (image recording body). The core sheet is particularly preferably white-colored.

Examples of materials of the core sheet include plastics. Specific examples thereof includes acetate films, triacetate cellulose films, nylon films, polyester films, polycarbonate films, polystyrene films, polyphenylene sulfide films, polypropylene films, polyimide films, vinyl chlorides and the like. Among these, polyester films and vinyl chlorides are preferably used.

Pigments and dyes are added to the materials to color them so as to form the core sheet. The core sheet may have a film-shaped form, plate-shaped form, or a shape having a thickness such that it is inflexible or has sufficient strength required for use as a core sheet.

Preferable examples of the core sheet used in the invention include plastic films having a thickness of in a range of 50 to 5,000 μm, and more preferable example thereof include PET films having a thickness of in a range of 100 to 1,000 μm.

Material to be Transferred Onto

A material to be transferred onto used in the invention can be made of metals, plastics, ceramics and the like, preferably being those having a sheet-shaped form.

Preferable examples of the material to be transferred onto used in the invention include plastic sheets. Particularly, preferable examples of the material to be transferred onto used in the invention are opaque so that an image formed on a light-transmissible film can be easily seen when it is formed into a plastic sheet (image recording body). Typical examples of the transferred body used in the invention include white-colored plastic sheets.

The same examples of resins for forming the plastic sheets can be used as the materials of the core sheet. Specific examples thereof include polyacetate films, triacetate cellulose films, nylon films, polyester films, polycarbonate films, polystyrene films, polyphenylene sulfide films, polypropylene films, polyimide films, cellophane, ABS (acrylonitrile-butadiene-styrene) resin films and the like.

Among the above examples, polyester films are preferably used, and particularly preferable examples thereof include PETG (a copolymer of polyethylene terephthalate with a modifying glycol), in which approximately half of ethylene glycol moieties of PET (polyethylene terephthalate) are substituted with 1,4-cyclohexane methanol moieties, materials which are formed by alloying PET by mixing polycarbonate therewith, and non-crystalline polyesters, which are non-biaxial-orientation and called "A-PET".

It is preferable that at least one surface, on which an image is transferred, of the transferred body used in the invention includes the PETG described above. By forming the image-transferred surface with PETG, transferred image forming material (toner) can be almost completely imbedded in the surface of the transferred body, thus a surface of a finally-obtained image recording body can be made in a similar condition as a surface of an electrophotography image forming material-transferring sheet.

When the image recording body of the invention is used as IC cards, magnetic cards or the like, IC chips, antennas, magnetic stripes, external terminals or the like are imbedded therein in accordance with necessity. Additionally, magnetic stripes or holograms may be printed, and/or required text information may be embossed thereon.

Film

Laminate Film for Electrophotography

A substrate used for a laminate film for electrophotography in the invention is required to have transparency. "Transparency" herein designates the characteristic to transmit light in a visible region to some extent. A substrate used in the invention is required to have transparency which at least allows visible observation of formed images through a side which is opposite to the side on which the image are formed.

The plastic films which can be used as materials of the core sheets can be similarly used for the substrate.

Among the above various plastic films, polyester films are preferably used, and particularly preferable examples thereof include PETG, described above, materials which are formed by alloying PET by mixing polycarbonate therewith, and non-crystalline polyesters, which are non-biaxial orientation called "A-PET".

A Vicat softening temperature (VST) of the substrate is preferably in a range of 70 to 130° C., and preferably in a range of 80 to 120° C.

If the VST of the substrate is lower than 70° C., insufficient adherence of the light-transmittable sheet to the core sheet (core) may occur in the heating-and-pressing process. If the VST of the substrate is higher than 130° C., image defects (image run) may occur owing to excessive softening of images (image forming materials), even though the above-described adherence is sufficient.

The Vicat softening temperature is measured by a method for evaluating a softening temperature of a thermoplastic resin. Examples of the method include known heat-resistance testing methods for shape-formed plastic materials, and specific examples thereof which are applied to for evaluation of thermoplastic resins include ASTM (American Society for Testing and Materials) Standard D1525, ISO (International Organization for Standardization) 306 and the like.

A surface resistivity of at least one surface of the substrate is preferably in a range of $1 \times 10^8$ to $1 \times 10^{13} \Omega$, and is more preferably in a range of $1 \times 10^9$ to $1 \times 10^{11} \Omega$.

If the surface resistivity is smaller than $1 \times 10^8 \Omega$, the resistance of an image recording body may become too small, which may cause disturbed toner transferred from a transfer member. If the surface resistivity is larger than $1 \times 10^{13} \Omega$, a resistance of a light-transmissible film may become too large, which may cause image defects caused by insufficient transfer owing to incapability of transfer of toner from the transfer member to a surface of the film.

The surface resistivity can be measured by using a circular electrode (for example, trade name: HR PROBE of HIRESTA-IP, manufactured by Mitsubishi Petrochemical Co., Ltd.,) under conditions of 23° C. and 55% RH in accordance with known surface resistivity measuring methods.

When only the surface on one side of a laminate film for electrophotography satisfies the above-described range, it is preferable that the surface on this side is the one on which an image is formed.

Examples of method for controlling a surface resistivity of at least one side surface of the substrate so as to be in the range of $1 \times 10^8$ to $1 \times 10^{13} \Omega$ include: adding surfactants, conductive polymer materials, conductive microparticles or the like to resins during formation of substrate films; coating surfactants on surfaces of the films; vapor depositing metallic thin films; and adding appropriate amounts of surfactants to adhesives or the like.

A thickness of the substrate is preferably in a range of 50 to 500 μm, and more preferably in a range of 75 to 150 μm. If the thickness is smaller than 50 μm, unfavorable conveyance conditions may be caused, and if the thickness is larger than 500 μm, image deterioration owing to unfavorable transfer may occur.

The laminate film for electrophotography used in the invention preferably has a image receiving layer formed on a surface of one side thereof and a function controlling means on a surface of the side which is opposite to the one on which the image receiving layer is formed.

The function controlling means preferably has at least one function selected from the group consisting of glossiness controlling, light resistance controlling, antimicrobial property controlling, flame retardancy controlling, releasing property controlling, and charging property controlling. Specifically, the function controlling means are provided so as to add and/or improve various functions such as glossiness, light resistance, antimicrobial property, flame retardancy, releasing property, and conductivity, and further preferably humidity resistance, thermal resistance, water repellency, abrasion resistance, and scratching resistance. Thereby the laminate film for electrophotography which has the function controlling means can exhibit resistances under various conditions of use.

Electrophotography Image Forming Material-Transferring Sheet

Materials which can be used for the substrate of the light-transmissible film can be similarly used for a substrate of an electrophotography image forming material-transferring sheet used in the invention.

The transferring sheet used in the invention preferably has an image receiving layer formed on at least one side surface of the substrate, in which the image receiving layer includes at least a releasing material, and a surface resistivity of the image receiving layer is in a range of $1 \times 10^8$ to $3.2 \times 10^{13} \Omega$ under conditions of 23° C. and 55% RH.

Namely, since the surface resistivity of the image receiving layer formed on a surface of the transferring sheet is in the appropriate range, favorable image formation can be implemented without occurrences of unfavorable transfer or the like in electrophotographic image formation. Further, since the image receiving layer includes the releasing material, which enables favorable transfer of image forming materials as described below to a transferred body, the fixation properties of the images are also excellent.

Releasing material is used in the image receiving layer of the transferring sheet which is used for temporarily fixing an image forming material thereon, and releasing the image forming material when it is heated-and-pressed with a body to be transferred onto. Accordingly, the releasing material preferably has adhesiveness, to toners which are generally used as image forming materials, and releasing properties.

The composition of the releasing material is not specifically limited, however, the releasing material preferably includes silicone hard coat material in view of possessing releasing properties and being able to suppress scratching of a surface of the film which may occur when the film is conveyed.

EXAMPLES

Example 1

Using an apparatus for manufacturing an image recording body shown in FIG. 1, and using a light-transmissible film (laminate film for electrophotography) as a film, a plastic sheet is prepared. A cleaning apparatus 50 in this manufacturing apparatus has a construction in which one cleaning roll pair 52 of a diameter of 50 mm composed of a butyl rubber (hardness: 40 to 70) is provided, and an charge-removing apparatus is not provided. A conveying rate of a laminate in cleaning apparatus 50 is 7 mm/sec.

In image forming apparatus 10, a color mirror image is formed containing a solid image (8 of 85.6 mm×54 mm card—sized images are arranged) is printed on a surface of a transparent film (A4 size, thickness: 100 μm, surface resistivity: $2.8 \times 10^{10} \Omega$, Vicat softening temperature: 78° C.). The transparent film is composed of a PETG resin, is stacked on a film stacker 11, and a surface temperature of the laminate film at the time of fixation is in a range of 95 to 100° C.

In the collating apparatus 20, the laminate film is overlaid on a front and back of a white sheet (trade name: DIA-CLARE W2012, manufactured by Mitsubishi Plastics, Inc.: A4 size; thickness 500 μm; Vicat softening temperature 85° C.) of an A4 size having a surface of PETG and an interior of A-PET set in a core sheet stacker 22 using collating tray 25. Positioning is performed on the image surfaces (laminate surfaces) so that the positions of the four corners of each film are aligned and for the laminate tentative fastening is performed, with a tentative fastening apparatus 26.

In a heating pressing apparatus 30 belts, constituting a belt pair 31, are stainless endless belts having: specular-processed surfaces, having a ten point average roughness Rz of 2 μm; circumferential length of 1000 mm; width of 340 mm, and a thickness is 0.2 μm. This belt is mounted on a laminating unit to form a belt pair 31, and the belts are set to apply a pressure of 1 MPa to a heating pressing roll pair 34.

In the present apparatus, a rate of conveying a laminate is 7 mm/sec, and a set temperature of heating pressing roll pair 34 in the laminating unit is 150° C.

One hundred plastic sheets having the aforementioned construction are continuously manufactured. Then, each of manufactured plastic sheets is cut into a card size, the presence or the absence of dirt or dust is confirmed by visual observation of each card, and no defects are detected in any of the cards.

Then, the one hundred plastic sheets are continuously manufactured according to the same construction except that a cleaning apparatus 50 in the manufacturing apparatus is removed. The presence or absence of dirt or dust is confirmed for each card obtained from a plastic sheet after manufacturing, and defects due to incorporation of dust is recorded in 30% of the cards.

Example 2

Using an apparatus for manufacturing an image recording body as shown in FIG. 2, and, using as a film an electrophotographic image forming material transferring sheet, an image recording body is manufactured. The construction of a cleaning apparatus 50 and other members in this manufacturing apparatus are the same as that of Example 1.

By setting a transferring sheet (A4 size, thickness: 100 μm, surface resistivity: $5.4 \times 10^{11} \Omega$, an image receiving layer having a thickness of 1 μm comprising a silicone hard coating agent containing a silicone fine particle) having a substrate of PET on a film stacker 11 in an image forming apparatus 10, and setting a white sheet (trade name: DIA-CLARE W2012, as above) of an A4 size having a surface of PETG and an interior of A-PET on a core sheet stacker 22 in a collating apparatus 20. 100 of the laminates are continuously manufactured, as in Experimental Example 1 and, subsequently, transferring sheets are peeled from front and back surfaces thereof with a peeling apparatus 80.

Then, each of the manufactured finished recordings of the material to be transferred onto is cut into a card size, the presence or the absence of dust or dirt is confirmed by visual observation of each card. No defects are perceived in any of the cards.

Then, 100 of the finished recordings of the materials to be transferred onto are continuously manufactured according to the same construction, except that a cleaning apparatus 50 in the manufacturing apparatus is removed. The presence or the absence of dust or dirt is confirmed similarly for each card obtained from a plastic sheet after manufacturing. Defects due to incorporation of dust is perceived in 50% of the cards.

As explained above, in the apparatus for manufacturing an image recording body of the invention (manufacturing process), since before a heating manufacturing step it becomes possible to remove dust or dirt on the surfaces of the laminate, the film or the support, an image recording body having a high good product ratio can be obtained.

What is claimed is:

1. A method for manufacturing an image recording body comprising:
   image-forming, to form an image on a surface of a film by an electrophotographic method;
   positioning, by overlaying the film onto a support so that at least one side of the support and a side of the film on which the image is formed are opposed to each other so as to obtain a laminate body; and
   heating and pressing the laminate body,
   wherein cleaning at least one of a surface of the laminate, a surface of the film and a surface of the support is conducted during at least one of a timing between the positioning and the heating and pressing and a timing between the image-forming and the positioning.

2. The method for manufacturing an image recording body according to claim 1, further comprising:
   image-forming, to form an image on a surface of a second film by an electrophotographic method, wherein each film is a laminate film for electrophotography,
   the positioning comprises forming the laminate body by overlaying two imaged laminate-films so that sides on which images of each of the laminate films are formed oppose each other via the supports, and
   the heating and pressing causes laminating of the support to the two imaged laminate films.

3. The method for manufacturing an image recording body according to claim 1, wherein:
   the film is an electrophotographic image forming material transferring sheet;
   a mirror image, that is formed by image forming material, is formed in the image-forming; and
   further comprising, after the heating and pressing, then cooling the image forming material then peeling the electrophotographic image forming material transferring sheet from the support so as to transfer the image forming material onto the support so as to record the image.

4. An apparatus for manufacturing an image recording body comprising:
   an image-forming device, which forms an image on a surface of a film by an electrophotographic method;
   a positioning device, which overlays the film onto a support so that at least one side of the support and a side of the film on which the image is formed are opposed to each other so as to obtain a laminate body; and
   a heating-and-pressing device, which heats and presses the laminate body,
   wherein a cleaning device, which cleans at least one of a surface of the laminate, a surface of the film and a surface of the support, is provided in a direction of conveyance of the film in at least one of a position between the positioning device and the heating-and-pressing device and a position between the image-forming device and the positioning device.

5. The apparatus for manufacturing an image recording body according to claim 4, wherein the cleaning device is provided between the positioning device and the heating-and-pressing device in the direction of conveyance of the film.

6. The apparatus for manufacturing an image recording body according to claim 4, wherein the cleaning device is provided between the image-forming device and the positioning device in the direction of conveyance of the film.

7. The apparatus for manufacturing an image recording body according to claim 4, wherein the cleaning device is provided both of the position between the image-forming device and the positioning device and the position between the positioning device and the heating-and-pressing device in the direction of conveyance of the film.

8. The apparatus for manufacturing an image recording body according to claim 4, wherein the cleaning device is provided between the positioning device and the heating-and-pressing device, between the image forming device and the positioning device, and between the positioning device and a support stacker in a direction of conveyance of the film.

9. The apparatus for manufacturing an image recording body according to claim 4, wherein:
   the image-forming device forms an image on a surface of a second film by an electrophotographic method and each film is a laminate film for electrophotography;
   the positioning device forms the laminate body by overlaying two imaged laminate films so that sides on which images of each of the laminate films are formed oppose each other via the support; and
   the heating-and-pressing device causes laminating of the support to the two imaged laminate films.

10. The apparatus for manufacturing an image recording body according to claim 4, wherein:
    the film is an electrophotographic image forming material-transferring sheet;
    a mirror image, that is formed by image forming material, is formed by the image-forming device; and
    further comprising a peeling device, which, after heating and pressing then cooling the electrophotographic image forming material transferring sheet, peels the electrophotographic image forming material transferring sheet from the support so as to transfer the image forming material onto the support so as to record the image, and which is provided after the heating-and-pressing device in a direction of conveyance of the film.

11. The apparatus for manufacturing an image recording body according to claim 4, wherein the cleaning device comprises at least one pair of cleaning rolls.

12. The apparatus for manufacturing an image recording body according to claim 11, wherein the cleaning roll is an adhesive roll.

13. The apparatus for manufacturing an image recording body according to claim 11, wherein the cleaning roll consists of a metal core and an adhesive elastic body, which is provided at a periphery of the metal core.

14. The apparatus for manufacturing an image recording body according to claim 4, wherein the cleaning device comprises a charge-removing member, for removing charge on a surface of the laminate body, and a pair of cleaning rolls.

15. The apparatus for manufacturing an image recording body according to claim 14, wherein the charge-removing member is a charge-removing brush.

* * * * *